(12) United States Patent
Yadav et al.

(10) Patent No.: US 11,669,404 B2
(45) Date of Patent: Jun. 6, 2023

(54) EFFICIENT ACCESS-BASED REALLOCATION OF BACKUP DATA WITHIN AN OBJECT STORAGE

(71) Applicant: EMC IP Holding Company LLC, Hopkinton, MA (US)

(72) Inventors: Sunil Yadav, Bangalore (IN); Ravi Vijayakumar Chitloor, Bengaluru (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 17/374,552

(22) Filed: Jul. 13, 2021

(65) Prior Publication Data
US 2022/0382652 A1    Dec. 1, 2022

(30) Foreign Application Priority Data
May 28, 2021   (IN) .............................. 202141023822

(51) Int. Cl.
*G06F 16/23* (2019.01)
*G06F 11/14* (2006.01)
*G06F 16/28* (2019.01)
*G06F 16/11* (2019.01)

(52) U.S. Cl.
CPC ...... *G06F 11/1451* (2013.01); *G06F 11/1461* (2013.01); *G06F 11/1469* (2013.01); *G06F 16/122* (2019.01); *G06F 16/23* (2019.01); *G06F 16/289* (2019.01); *G06F 2201/80* (2013.01); *G06F 2201/82* (2013.01)

(58) Field of Classification Search
CPC ............ G06F 11/1451; G06F 2201/84; G06F 11/1469; G06F 11/1461; G06F 16/128; G06F 11/1446
See application file for complete search history.

(56) References Cited

U.S. PATENT DOCUMENTS

| | | | |
|---|---|---|---|
| 2009/0249005 A1* | 10/2009 | Bender | G06F 11/1458 711/E12.001 |
| 2019/0065322 A1* | 2/2019 | Chakankar | G06F 16/27 |
| 2020/0073575 A1* | 3/2020 | Cai | G06F 3/0649 |

* cited by examiner

*Primary Examiner* — Apu M Mofiz
*Assistant Examiner* — Cindy Nguyen
(74) *Attorney, Agent, or Firm* — Dergosits & Noah LLP; Todd A. Noah (57) ABSTRACT

Described is a system (and method) for efficient access-based reallocation of backup data stored within an object storage. The system may implement various specialized procedures to efficiently store and manage backup data within the object storage. These procedures may include packing backup data into objects to improve data operation efficiency. The system may also conserve storage space on the object storage by performing an analysis to reallocate backup data as necessary. For example, data may be stored in objects in an immutable manner, and thus, the system may efficiently reallocate data to new objects based on data access patterns. For example, the system may determine an access pattern associated with live data remaining within the first object satisfies a condition, and in response, reallocated the live data to a new object.

20 Claims, 4 Drawing Sheets

EFFICIENT ACCESS-BASED REALLOCATION OF BACKUP DATA WITHIN AN OBJECT STORAGE

CLAIM OF PRIORITY

This application claims priority to India Patent Application No. 202141023822, filed May 28, 2021, the contents of which is hereby incorporated by reference in their entirety.

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on a third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). To provide access to these object storages, the cloud-based providers often make available various storage APIs (Application Programming Interfaces). However, due to the universal nature of these APIs, relying directly on such APIs for backup operations often requires large amounts of storage space to meet certain recovery needs. For example, clients may require backup data to adhere to certain retention requirements, which results in using tools to store data as immutable objects. These tools, however, may handle client data in a uniform manner; thus limiting the ability to implement data-specific storage techniques. Accordingly, the native capabilities of cloud-based object storages may lead to an inefficient allocation of storage resources for backup data which in turn increases storage costs. Thus, there is a continued need to efficiently manage storage space when relying on cloud-based object storages for data protection and backup.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for efficient access-based reallocation of backup data stored within an object storage. In some embodiments, the system may be implemented as part of an incremental backup infrastructure. For example, in order to conserve storage space, the system may perform incremental backups when storing client backup data to the object storage. However, the system may perform a full restore of the client data to a point-in-time of any incremental backup by reconstructing (e.g. synthetically) the client data as if a full backup was performed. Accordingly, the system may implement the access-based reallocation as part of a data protection infrastructure that efficiently stores and manages backup data within a cloud-based object storage. More particularly, in some embodiments, to conserve storage space on the object storage, the system may perform an analysis to reallocate existing backup data amongst objects as necessary. For example, data may be stored in objects in an immutable manner, and thus, the system may efficiently reallocate data to new objects. For example, the system may reallocate live data remaining within an object to a newly created object when certain conditions associated with the live data are present. In other words, the system may reallocate the live data to a new object to free up the storage space of the old object. When reallocating data, the system may determine whether access patterns associated with the live data are present. In addition, in some embodiments, the system may reallocate data only when the amount of live data within an object falls below a predetermined threshold. To provide such a capability, in some embodiments, the system may perform a specialized procedure to pack backup data into objects, and leverage information stored by a specialized metadata database maintained by the system as part of the data management infrastructure.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
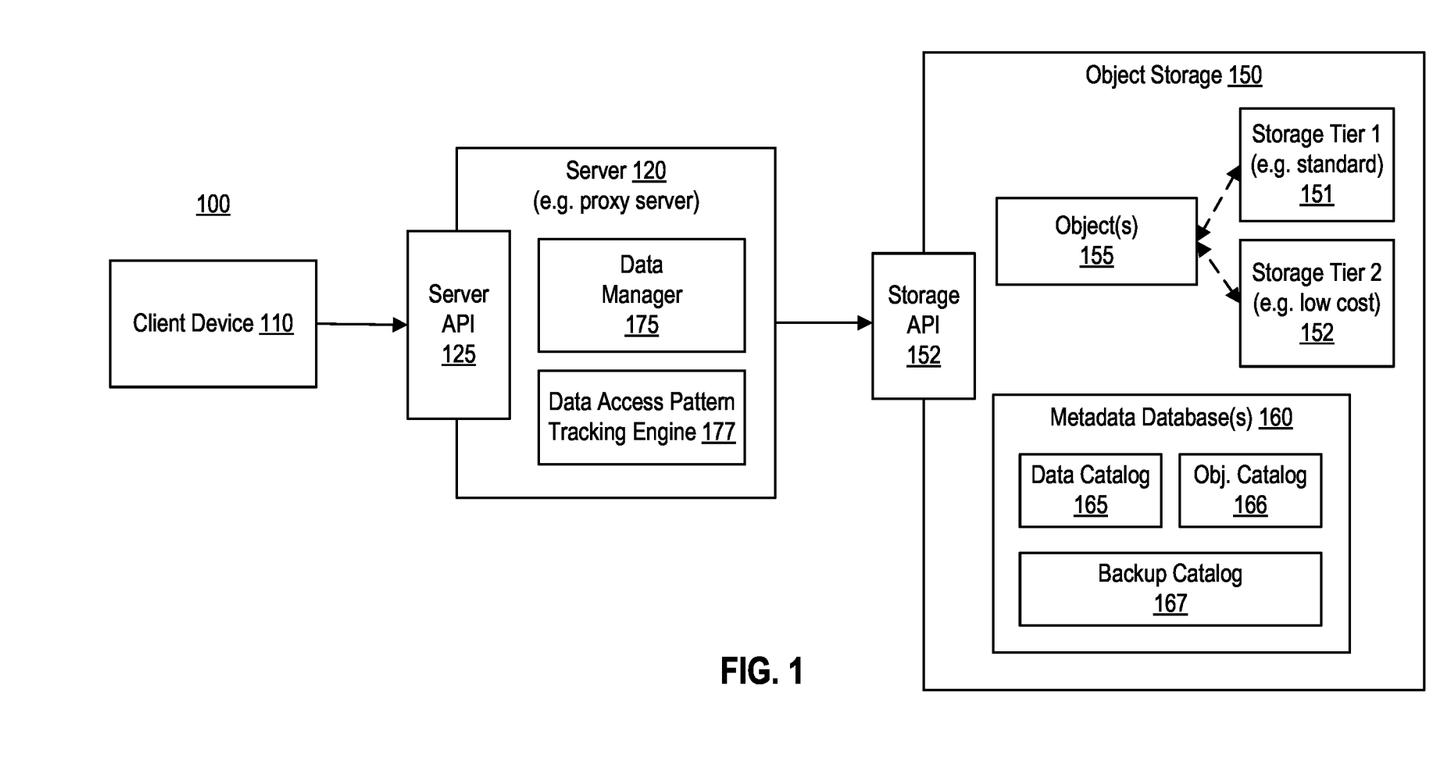
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g. depending on the cloud-based storage provider). For example, these containers or buckets may be associated with a policy that determine what actions can performed in association with the objects stored therein. As shown, the object storage 150 may include various storage tiers including storage tier 1 151, and storage tier 2 152. Accordingly, objects 155 (e.g. backed up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs. For example, storage tier 1 151 may be a standard (or high performance) storage tier that is associated with a first storage cost (or cost per unit of storage), and storage tier 2 152 may be an archival or low-cost storage tier that is associated with a second storage cost (or cost per unit of storage). For example, the storage cost (e.g. GB/month) associated with storage tier 2 152 may be lower than the storage cost associated with storage tier 1 151. Thus, efficiently storing data on a lower tier storage may provide substantial cost savings to a subscriber (e.g. a backup service provider, or user) of the cloud-based storage service. For example, storage tier 1 151 may have a cost of 2.3 cents (or $0.023) per GB/month, while storage tier 2 152 may have a cost of 0.4 cents (or $0.004) per GB/month. Accordingly, re-tiering data to storage tier 2 152 would result in a significant reduction in storage costs. It should be noted that other storage costs (or fees) such as access fees or bandwidth fees may also be reduced using a lower cost storage tier. In addition, although only two storage tiers are shown, additional storage tiers with varying costs are also contemplated.

The client device 110 may use the server 120 as an intermediary for managing client backup data stored on the object storage 150. In some embodiments, the server 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for re-tiering data (e.g. objects) stored on the object storage 150. For example, a re-tiering operation may move an object from a first storage tier (e.g. storage tier 1 151) to a second (or lower) storage tier (e.g. storage tier 2 152). It should be noted that the same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as the criteria for reallocating (or moving) live data to a new object as further described herein. In addition, the data manager 175 may direct (or control, initiate, etc.) other components of the operating environment 100 to perform various processes as further described herein.

The server 120 may also include a data access pattern tracking engine (or manager, component, etc.) 177. The data access pattern tracking engine 177 (or tracking engine 177) may work in conjunction with, or be part of, the data manager 175. The tracking engine 177 may analyze how backup data stored on the object storage 150 is accessed, and this information may be referenced when reallocating data. For example, the server 120 may access information captured by the tracking engine 177 and determine whether certain conditions are present. When such conditions are detected, the server 120 may initiate a reallocation of data stored within an object to newly created objects as further described herein To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 152. In addition, portions of the metadata database 160 may be cached on a memory (or storage) of the server 120 to further improve performance of various backup or restore operations.

The metadata database 160 may store metadata associated with client data stored on the client device 110 and/or backed up to the object storage 150. The metadata database 160 may also store various types of backup information associated with the backed up client data and/or backups performed.

For example, the metadata database 160 may include a data catalog (or table, database, index, etc.) 165. The data catalog 165 may store information associated with the data stored as part of each backup. For example, the information may include a point-in-time the client data was backed up, a storage location of the backed-up client data (including storage tier), an object ID to which the backed up client data is stored, and various other types of information. Accordingly, a data catalog 165 (or instance thereof) may be updated after each backup is performed. In some embodiments, the data catalog 165 may be maintained for a particular account (e.g. user, client, customer, etc.) associated with the object storage 150. The data catalog 165 may also store various types of backup information associated with the backed up client data.

The metadata database 160 may include an object catalog (or table, database, index, etc.) 166 that stores information associated with the objects 155 that store backup data. The object catalog 166 may also store information associated with objects 155 that store backup data such as data IDs of backup data stored by an object, data offsets (or storage location information within object), creation date, and other types of information that may be associated with an object 155. In addition, the object catalog 166 may include a storage location including a storage tier indicating where particular object 155 is stored on the object storage 150.

The metadata database 160 may also include a backup catalog (or index, table, database, etc.) 167 that stores information associated with each backup performed to the object storage 150. For example, the backup catalog 167 may include backup times specifying when each backup was performed, a backup expiration time, a type of backup (e.g. full or incremental), and any other information that may be associated with performing a backup. In addition, the backup catalog 167 may also include a list of objects required to perform a full restore to each of the backup times.

In addition, the metadata database 160 (e.g. as part of a data catalog 165 and/or object catalog 166) may store information associated with whether data (e.g. a backup of file) stored within the object storage is live or dead. As referred to herein, "live" data may include data stored on the object storage that is still required for recovery purposes. For instance, live data may include backup data that does not correspond to client data that has been deleted. As referred to herein, "dead" data may include data (or an instance thereof) that is no longer required for recovery purposes. For example, dead data may include data stored on the object storage that corresponds to data that has been deleted from the client device. Accordingly, the server 120 may not need to retain such data on the object storage. As another example, dead data may include data on the object storage 150 that may be redundant or expired.

Figure 2:
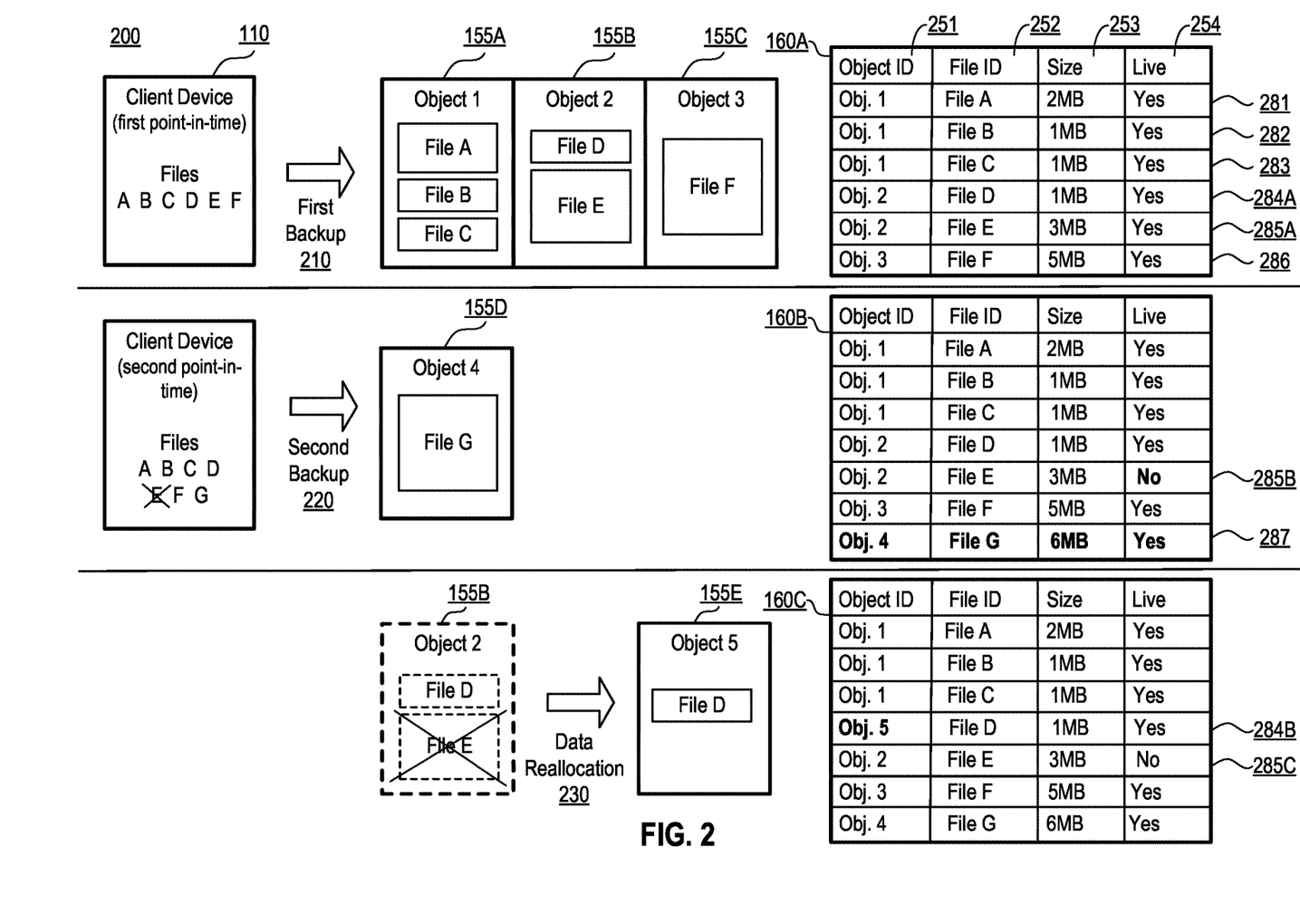
FIG. 2 is a diagram illustrating an example of managing backup data within one or more objects and in association with a metadata database according to one or more embodiments of the disclosure.

FIG. 2 is a diagram illustrating an example of managing backup data within one or more objects and in association with a metadata database according to one or more embodiments of the disclosure.

In this example, the client data includes files although any type of data is contemplated. As shown, the client device (e.g. client device 110) at a first point-in-time stores files A, B, C, D, E, and F. Accordingly, as part of performing a first (or initial) backup 210 (e.g. at the first point-in-time), the server (e.g. server 120) may store the files within newly created objects 155A, 155B, and 155C (e.g. objects 1, 2, and 3) of the object storage (e.g. object storage 150). In other words, objects 155A, 155B, and 155C may be associated with the first backup 210 and/or the first point-in-time.

To efficiently utilize storage space on the object storage, the server may perform a packing (or grouping, combining, etc.) of backup files. Accordingly, the system may categorize the backup files based on their size (or file size). For example, the server may categorize these files based on a predetermined size (or threshold size). In some embodiments, the predetermined size may be based on a specialized (or near optimal) size for storing data and/or objects when performing data operations. For example, if the system stores files that are too large, processing performance may be hindered based on the amount of data required to transfer and/or traverse. However, if the system stores files that are too small, processing performance may suffer from the increased number of files required to be read/written for a given amount of data. By way of example, in some embodiments, the server may set the predetermined size to approximately 4 MB, which may be a specialized size for organizing data within a deduplication storage system. Accordingly, for backup files that are categorized as having a file size greater than or equal to 4 MB, the server may write each of these files as an individual object. For backup files that are categorized as having a file size less than 4 MB, the server may determine file combinations to perform a file packing. For example, the server may group backup files together such that the combined (or total) file size of the group is approximately 4 MB. In some embodiments, the server may determine file combinations in which the combined group of files have a total size within a range of the predetermined size (e.g. within a range of 4 MB). Accordingly, the server m may write (or store) each of these combinations of files as a shared (or packed) object.

Thus, in this example, the server may pack files into certain the objects 155 such that shared (or packed) objects store approximately 4 MB of data. For example, the server may write (e.g. pack) files A, B, and C, which are approximately 2 MB, 1 MB, and 1 MB in size respectively, within object 1 155A; files D, and E, which are approximately 1 MB and 3 MB in size respectively, within object 2 155B; and file F, which is approximately 5 MB in size, within its own object: object 155C. In other words, objects 155A and 155B may be considered shared (or packed) objects, and object 155C may be considered an individual object.

Additionally, the server may store metadata associated with the backed up client data within the metadata database 160 (or instances or versions thereof). In this example, the metadata database 160 is in the form of a table although any data structure may be used. As shown, the metadata database 160 may store various types of information such as an object ID 251 that indicates the object in which the file (or data) is stored, an ID 252 that uniquely identifies the file, a size 253 that indicates the approximate size of the file, and a live indicator 254 that indicates whether the particular file represents client data (or file) that is live or dead.

As shown, metadata database 160A the state of the metadata database based on the first backup 210. In other words, metadata database 160A represents the instance of the metadata database 160 at the first point-in-time. For example, in response to the first backup 210, the server may store entries 281, 282, 283, 284A, 285A, and 286 that correspond to files A, B, C, D, E, and F respectively. By way of example, entry 281 indicates that file A is stored in object 1, has an approximate size of 2 MB, and is a live data item.

Continuing with this example, after performing the first backup 210, the client data stored on the client device may subsequently change. As shown, the client device 110, at the second point-in-time, may now store new file G, and file E has been deleted. Accordingly, as part of performing a second (or subsequent) backup 220 (e.g. at the second point-in-time), the server may write (or store) file G, which is approximately 6 MB in size, within newly created object 155D (e.g. object 4). Accordingly, object 155D may be associated with the second backup 220 and/or the second point-in-time. Metadata database 160B represents the state of the metadata database based on the second backup 210. For example, in response to the second backup 220, the server may store new entry 287 that corresponds to new file G. As shown, entry 287 indicates that file G is stored in object 155D, has an approximate size of 6 MB, and is a live data item. In addition, in response to the deletion of file E on the client device 110, the server may indicate that file E has been deleted. In particular, as shown in metadata database 160B, the server may update the corresponding entry (previous entry 285A), now shown as entry 285B, to indicate that file E is no longer live (e.g. dead).

In some embodiments, the second backup 220, may be an incremental backup (e.g. at a second point-in-time). To perform the incremental backup (also referred to as a differential incremental backup), the server may determine the changes (or delta) of client data between the point-in-time of the previous backup (e.g. first point-in-time) and the point-in-time of the current backup (e.g. second point-in-time). In addition, as part of performing the second backup 220 (e.g. an incremental backup), the server may only store the new data (e.g. file G), and the previously backed up files (e.g. files A-F) are retained in objects 1-3 155A-C. In other words, the data of objects 155A, 155B, and 155C are not copied to additional objects as part of the second backup 220. Instead, when a recovery is required, the server may combine the required data from objects 155A-E (minus any deleted objects) to create a complete dataset. In other words, the server may combine the data at the time of recovery to conserve storage space on the object storage.

To efficiently managing storage space within the object storage, the server may periodically perform a data reallocation 230. The server may perform such a reallocation by determining whether any of the objects 155 store dead (e.g. deleted) data. In other words, the server may determine whether any of the objects 155 currently storing data have an amount of live data that falls below a predetermined threshold. In this example, if the predetermined threshold is less than or equal to 50% of the data stored by the object being live, then the deletion of file E results in object 155B storing only 25% live data (e.g. 1 MB out of 4 MB).

Once the system identifies candidate objects/files for reallocation, the system may determine whether certain conditions are satisfied to reallocate the remaining live data to a new object. As described, these conditions may be based on access patterns associated with the remaining live data. In this example, in response to the deletion of file E, the server may determine access patterns associated with file D (e.g. the remaining live data within object 155B) satisfies conditions for reallocating (or moving) data. In particular, as shown, file D may be written to newly created object 155E (e.g. object 5). The server may also update the corresponding entry (previous entry 284A), now shown as 284B in metadata database 160C, to indicate that file D is now stored in object 5.

In some embodiments, the server may delete object 155B in response to reallocating the remaining live data (e.g. file D) to object 155E. Accordingly, the server may update the corresponding entry for file E, shown as entry 285C in metadata database 160C. Although not shown, this update may include deleting entry 285C, or updating entry 285C to indicate that object 2 (e.g. object 155B) has been deleted. In some embodiments, instead of deleting file E completely from the object storage, the server may move file E to another (e.g. lower) storage tier. In such a scenario, entry 285C may be updated to indicate the new storage location.

It should be noted that the metadata database 160 (or instances thereof) may also include additional types of metadata (not shown). For example, the metadata database 160 may include metadata associated with a particular backup such as point-in-time information indicating when the backup was performed. This information may be stored as part of the metadata database 160, or may be stored in a separate database by the server. Accordingly, the server may determine which objects 155 or data (e.g. files) are associated with a particular backup and/or a point-in-time, for example, when performing client data recovery.

In some embodiments, as part of storing (or packing) data into objects 155 of the object storage, the server may perform additional operations to efficiently manage data (e.g. backup data). In some embodiments, storing data within the objects 155 may include performing compression and/or encryption of the data. For example, files A-C stored within object 155A may be compressed and/or encrypted by the server. In addition, the server may perform a deduplication when storing data within the objects 155A-E. For example, if file G is a copy of file F, as part of the second backup 220, the server may not store a duplicate copy of file G on object 155D, and instead, only update metadata database 160B to indicate that file G is already stored by object 155C as file F.

Figure 3:
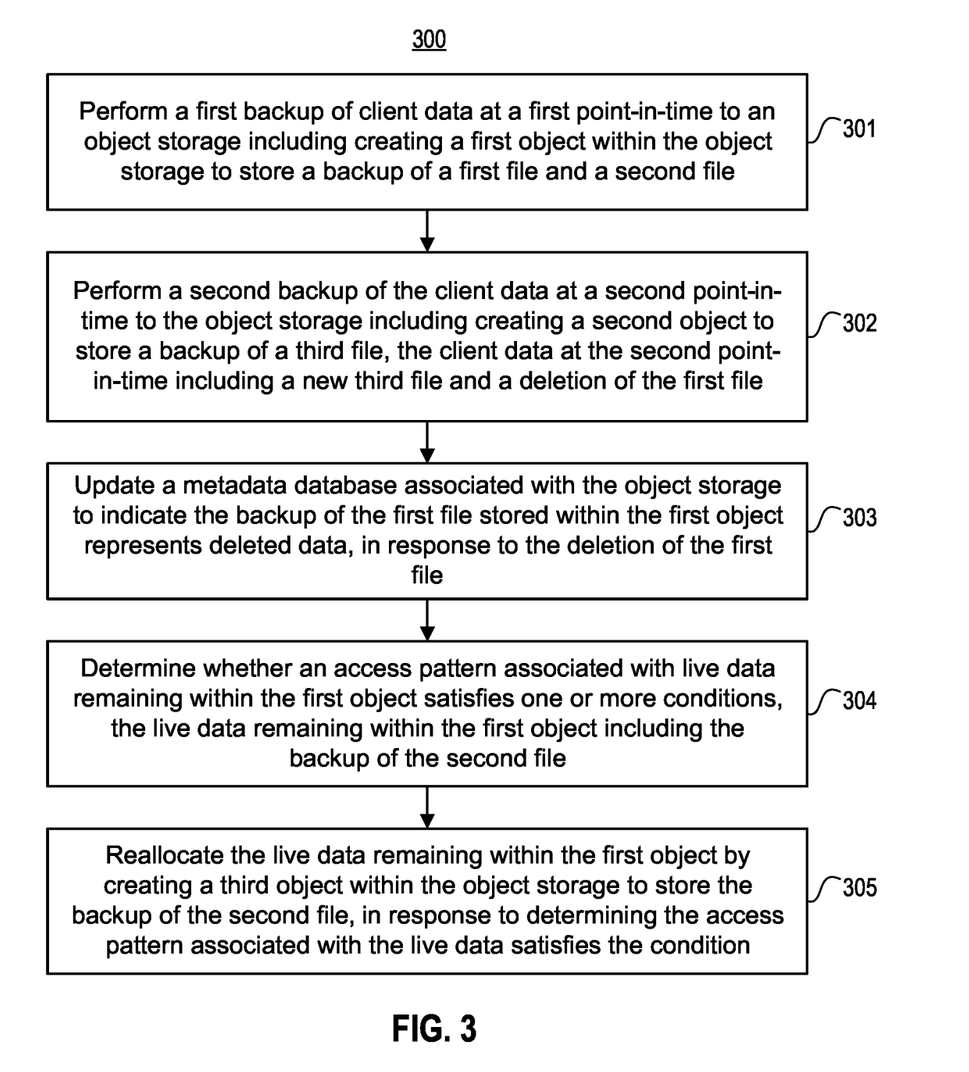
FIG. 3 is a flow diagram illustrating an example method of reallocating data within an object storage based on access patterns according to one or more embodiments of the disclosure.

FIG. 3 is a flow diagram illustrating an example method of reallocating data within an object storage based on access patterns according to one or more embodiments of the disclosure. Process 300 may use processing logic, which may include software, hardware, or a combination thereof. For example, process 300 may be performed by a system including one or more components described in operating environment 100 (e.g. server 120).

In 301, the system (e.g. server 120) may perform a first backup of client data stored on a client device (e.g. client device 110) at a first point-in-time to an object storage (e.g. object storage 150). The client data at the first point-in-time may include a first file and a second file. In other words, the state of client data at the first point-in-time may include a first file and a second file. Accordingly, the first backup may include creating (or writing) a first object within the object storage to store a backup of the first file and a backup of the second file. For example, with reference to diagram 200, the system may perform a first backup 210 including storing backup of files D (e.g. first file) and E (e.g. second file) of the client device 110 to object 155B (e.g. a first object).

In some embodiments, the system may update a metadata database (e.g. metadata database 160) to indicate the backup of the first file and the second file are stored within the first object. For example, this update may be performed in response to performing the first backup. For example, with reference to diagram 200, the system may store entries 284A, and 285A (e.g. a first set of metadata) identifying backup of files D and E are stored within object 2 (e.g. object 155B).

In 302, the system may perform a second backup of the client data stored on the client device at a second point-in-time to the object storage. The second backup may be performed after the first backup. In other words, the second point-in-time may be after the first point-in-time. For example, the second backup may be an incremental backup performed after the first backup. The client data at the second point-in-time may include a new third file and a deletion of the first file. For example, the state of the client data stored on the client device at the second point-in-time may include a third file that was created (or added) to the client device since the first point-in-time, and the first file may be been deleted from the client device since the first point-in-time. Accordingly, the second backup (e.g. as part of an incremental backup) may include creating (or writing) a second object within the object storage to store a backup of the third file. As described, the second backup may be an incremental backup, and accordingly, only the changes (e.g. delta) between the first backup and the second backup may be captured by the system (e.g. the addition of the third file and the deletion of the first file). For example, with reference to diagram 200, the system may perform a second backup 220 including storing a backup of new file G (e.g. third file) within object 155D (e.g. second object).

In some embodiments, the system may update the metadata database to indicate the backup of the third file is stored within the second object. In some embodiments, this update may be performed in response to performing the second backup. For example, with reference to diagram 200, the system may store entry 287 (e.g. a second set of metadata) identifying the backup of file G is stored within object 4 (e.g. object 155D).

In 303, the system may update a metadata database associated with the object storage to indicate the backup of the first file stored within the first object represents deleted (or dead) data. In some embodiments, the system may perform such an update in response to the deletion of the first file. For example, in some embodiments, the object stored by the object storage may be immutable, and thus, instead of deleting the corresponding backup of the first file stored within the first object of the object storage, the system may indicate (e.g. mark, flag, etc.) that the backup of the first file represents deleted data (e.g. dead data) on the client device at the time of the second backup (e.g. second point-in-time). For example, with reference to diagram 200, the system may store entry 285B (e.g. a third set of metadata) identifying file E has been deleted from the client device since the first backup. In some embodiments, storing the third set of metadata may include overwriting some of the first set of metadata. For example, with reference to diagram 200, entry 285B may overwrite entry 285A to indicate the backup of file E is dead (e.g. deleted).

As described, the system may perform an efficient reallocation of data stored on the object storage. In particular, in 304, the system may determine whether an access pattern associated with live data remaining within the first object satisfies a condition. In some embodiments, the live data remaining within the first object includes the backup of the second file.

The access pattern may be based on an access pattern associated with the second file stored on the client file, and/or the backup of the second file stored within the first object on the object storage.

Accordingly, in some embodiments, the system may determine the access pattern satisfies the condition in response to determining the backup of the second file stored on the object storage has been accessed a predetermined number of times within a given (or predetermined) time period. For example, the system may determine whether the backup of the second file stored within the first object has been accessed to perform a restore at least once within the last 30 days. If so, the system may determine the access pattern satisfies the condition and the backup of the second file may be a candidate for reallocation to a new object.

In addition, or as an alternative, in some embodiments, the system may determine the access pattern satisfies the condition in response to determining the second file stored on the client device has been accessed a predetermined number of times within a given (or predetermined) time period. For example, the system may track (or count) the number of times the second file has been accessed on client device in the last 5 days. Accordingly, if the number satisfies a certain number (e.g. 10 times), the system may determine the access pattern satisfies the condition and the corresponding backup of the second file stored on the object storage may be a candidate for reallocation to a new object.

The access pattern may also be based on an amount of time the backup of the second file has been stored on the object storage.

Accordingly, in some embodiments, the system may determine the access pattern satisfies the condition in response to determining a predetermined amount of time has elapsed since storing the backup of the second file on the object storage. For example, the system may determine the amount of time since the time of storing the backup of the second file to the first object. Accordingly, if the amount of time reaches the predetermined amount of time (e.g. 30 days), the system may determine the access (e.g. storage) pattern satisfies one or more conditions and the corresponding backup of the second file stored on the object storage may be a candidate for reallocation to a new object.

In 305, the system may reallocate the live data remaining within the first object by creating a third object within the object storage to store the backup of the second file. The system may perform the reallocation in response to determining the access pattern associated with the live data satisfies the condition. In other words, the system may move the live data remaining (e.g. the backup of the second file) to a new object. For example, with reference to diagram 200, the system may determine the deletion of file E results in the satisfaction one or more conditions for reallocating data. For example, an access pattern associated with file D (e.g. the live data remaining within object 155B) may satisfy a condition, and accordingly, file D may be stored in newly created object 155E (e.g. third object).

In some embodiments, the system may update the metadata database to indicate the backup of the second file is stored within the third object. For example this update may be performed in response to reallocating the live data. For example, in reference to diagram 200, the system may update the previous entry 284A to entry 284B as shown in metadata database 160C, to indicate that file D is now stored in object 5 (e.g. object 155E).

In some embodiments, the reallocation allows the system free up storage space on the object storage by allowing the first object to expire, be deleted, and/or moved to a lower tier storage. For example, the first object may be allowed to expire and thus be subject to a periodic garbage collection process.

In some embodiments, the system may also reallocate the live data based on the amount live data remaining within an object. More particularly, in some embodiments, the system may determine whether an amount of the live data remaining within the first object falls below a predetermined threshold. Accordingly, in some embodiments, the system may reallocate the live data in further response to determining the amount of the live data remaining within the first object falls below the predetermined threshold. For example, with reference to diagram 200, the system may determine whether the 1 MB of file D (e.g. the amount of live data remaining) within object 155B fails below the predetermined threshold.

The threshold may be based on a relative value such as the amount of live data vs. the total size of the object, the amount of live data vs. the amount of dead data stored by the object, or the amount of dead data vs. the size of the object. For example, the system may determine whether the amount of live data falls below 50% of the total amount of data within an object. The threshold may also be based on an absolute value such as the amount of remaining live data or the amount of dead data within an object. For example, the server may determine whether the amount of live data is less than (or falls below) an absolute value (e.g. 2 MB).

Accordingly, in some embodiments, the system may determine whether the amount of live data remaining within the first object falls below the predetermined threshold based on an amount of the live data remaining within the first object compared to an amount of the deleted (or dead) data within the first object. For example, with reference to diagram 200, the system may compare 1 MB of file D (e.g. the amount of live data remaining) and the 3 MB of deleted file E (the amount of data deleted) to calculate a live data vs. dead ratio used as the predetermined threshold. For instance, the predetermined threshold may be satisfied when the ratio of live data to dead data drops below 50%. Accordingly, the 1 MB to 3 MB ratio (or 33%) of the above example would satisfy such a threshold. As another example, the predetermined threshold may be satisfied when the amount of live data drops below 30% of the total amount of data stored within the first object. Accordingly, the 1 MB of live data from a total of 4 MB of data (e.g. 25%) of live data remaining in the above example would satisfy such a threshold.

In addition, in some embodiments, the system may determine whether the amount of live data remaining within the first object falls below a predetermined threshold in response to recognizing that client data has been deleted from the client device since the first backup. For example, recognizing (or detecting, determining, etc.) may trigger the system to analyze objects storing deleted data to determine whether the live data remaining in such objects should be reallocated. For example, with reference to diagram 200, the system may determine whether the amount of live data remaining within object 155B fails below the predetermined threshold based on the determination that the deleted file E was stored in object 155B.

In some embodiments, determining whether the amount of live data remaining within the first object falls below the predetermined threshold may include retrieving, from the metadata database, a first set of metadata identifying the client data stored within the first object, and a third set of metadata identifying the client data that has been deleted since the first backup. Accordingly, the system may determine the amount of live data remaining within the first object based on data size information obtained from the retrieved first set of metadata and the retrieved third set of metadata. For example, with reference to diagram 200, the system may retrieve entry 284A (e.g. the first set of metadata), and entry 285B (e.g. the third set of metadata), and determine the amount of live data remaining within the first object based on the file size information (e.g. size 253) obtained from the entries 284A, and 285B. For example, the system may determine file D is 1 MB from entry 284A, and file E, which has been deleted, is 3 MB from entry 285B; thus, the amount of live data remaining with object 155B is 1 MB (e.g. only file D is live).

Accordingly, in some embodiments, the system may efficiently manage and reallocate data within an object storage based on an access pattern, the amount of live data remaining within an object, or a combination thereof.

Figure 4:
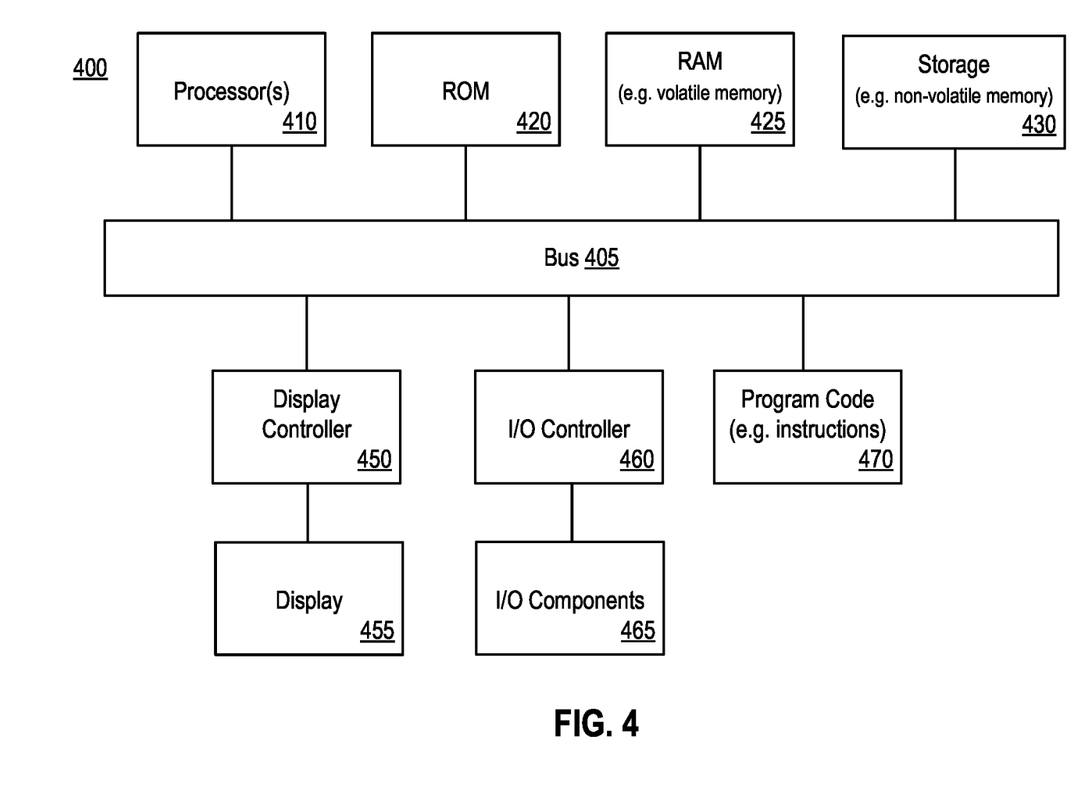
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. server 120, data manager 175, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. server 120, data manager 175, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform a first backup of client data stored on a client device at a first point-in-time to an object storage, the client data at the first point-in-time including a first file and a second file, the first backup including creating a first object within the object storage to store a backup of the first file and the second file;
   perform, after the first backup, a second backup of the client data stored on the client device at a second point-in-time to the object storage, the client data at the second point-in-time including a new third file and a deletion of the first file, the second backup including creating a second object within the object storage to store a backup of the new third file;
   update a metadata database associated with the object storage to indicate the backup of the first file stored within the first object represents deleted data, in response to the deletion of the first file;
   determine whether an access pattern associated with live data remaining within the first object satisfies one or more conditions, the live data remaining within the first object including the backup of the second file; and
   reallocate the live data remaining within the first object by creating a third object within the object storage to store the backup of the second file, in response to determining the access pattern associated with the live data satisfies the condition.

2. The system of claim 1, wherein the plurality of instructions, when executed, further cause the one or more processors to:
   determine whether an amount of the live data remaining within the first object falls below a predetermined threshold, wherein
   reallocating the live data is further in response to determining the amount of the live data remaining within the first object falls below the predetermined threshold.

3. The system of claim 2, wherein the predetermined threshold is based on an amount of the live data remaining within the first object compared to an amount of the deleted data within the first object.

4. The system of claim 1, wherein the one or more conditions include:
   the backup of the second file stored on the object storage being accessed a predetermined number of times within a given time period.

5. The system of claim 1, wherein the one or more conditions include:
   the second file stored on the client device being accessed a predetermined number of times within a given time period.

6. The system of claim 1, wherein the one or more conditions include:
   a predetermined amount of time elapsing since storing the backup of the second file on the object storage.

7. The system of claim 1, wherein the plurality of instructions, when executed, further cause the one or more processors to:
   update the metadata database to indicate the backup of the second file is stored within the third object, in response to reallocating the live data.

8. The system of claim 1, wherein the plurality of instructions, when executed, further cause the one or more processors to:
   update the metadata database to indicate the backup of the first file and the backup of the second file are stored within the first object, in response to performing the first backup; and
   update the metadata database to indicate the backup of the third file is stored within the second object, in response to performing the second backup.

9. A method comprising:
   performing a first backup of client data stored on a client device at a first point-in-time to an object storage, the client data at the first point-in-time including a first file and a second file, the first backup including creating a first object within the object storage to store a backup of the first file and the second file;
   performing, after the first backup, a second backup of the client data stored on the client device at a second point-in-time to the object storage, the client data at the second point-in-time including a new third file and a deletion of the first file, the second backup including creating a second object within the object storage to store a backup of the new third file;

updating a metadata database associated with the object storage to indicate the backup of the first file stored within the first object represents deleted data, in response to the deletion of the first file;

determining whether an access pattern associated with live data remaining within the first object satisfies a condition, the live data remaining within the first object including the backup of the second file; and reallocating the live data remaining within the first object by creating a third object within the object storage to store the backup of the second file, in response to determining the access pattern associated with the live data satisfies the condition.

10. The method of claim 9, further comprising:

determining whether an amount of the live data remaining within the first object falls below a predetermined threshold, wherein reallocating the live data is further in response to determining the amount of the live data remaining within the first object falls below the predetermined threshold.

11. The method of claim 10, wherein the predetermined threshold is based on an amount of the live data remaining within the first object compared to an amount of the deleted data within the first object.

12. The method of claim 9, wherein the one or more conditions include:

the backup of the second file stored on the object storage being accessed a predetermined number of times within a given time period.

13. The method of claim 9, wherein the one or more conditions include:

the second file stored on the client device being accessed a predetermined number of times within a given time period.

14. The method of claim 9, wherein the one or more conditions include:

a predetermined amount of time elapsing since storing the backup of the second file on the object storage.

15. A computer program product comprising a non-transitory computer-readable medium having a computer-readable program code embodied therein to be executed by one or more processors, the program code including instructions to:

perform a first backup of client data stored on a client device at a first point-in-time to an object storage, the client data at the first point-in-time including a first file and a second file, the first backup including creating a first object within the object storage to store a backup of the first file and the second file;

perform, after the first backup, a second backup of the client data stored on the client device at a second point-in-time to the object storage, the client data at the second point-in-time including a new third file and a deletion of the first file, the second backup including creating a second object within the object storage to store a backup of the new third file;

update a metadata database associated with the object storage to indicate the backup of the first file stored within the first object represents deleted data, in response to the deletion of the first file;

determine whether an access pattern associated with live data remaining within the first object satisfies one or more conditions, the live data remaining within the first object including the backup of the second file; and reallocate the live data remaining within the first object by creating a third object within the object storage to store the backup of the second file, in response to determining the access pattern associated with the live data satisfies the condition.

16. The computer program product of claim 15, wherein the program code includes further instructions to:

determine whether an amount of the live data remaining within the first object falls below a predetermined threshold, wherein reallocating the live data is further in response to determining the amount of the live data remaining within the first object falls below the predetermined threshold.

17. The computer program product of claim 16, wherein the predetermined threshold is based on an amount of the live data remaining within the first object compared to an amount of the deleted data within the first object.

18. The computer program product of claim 15, wherein the one or more conditions include:

the backup of the second file stored on the object storage being accessed a predetermined number of times within a given time period.

19. The computer program product of claim 15, wherein the one or more conditions include:

the second file stored on the client device being accessed a predetermined number of times within a given time period.

20. The computer program product of claim 15, wherein the one or more conditions include:

a predetermined amount of time elapsing since storing the backup of the second file on the object storage.

* * * * *